April 4, 1939.  F. A. MANNING  2,153,259
SECURING MEANS
Filed June 9, 1938
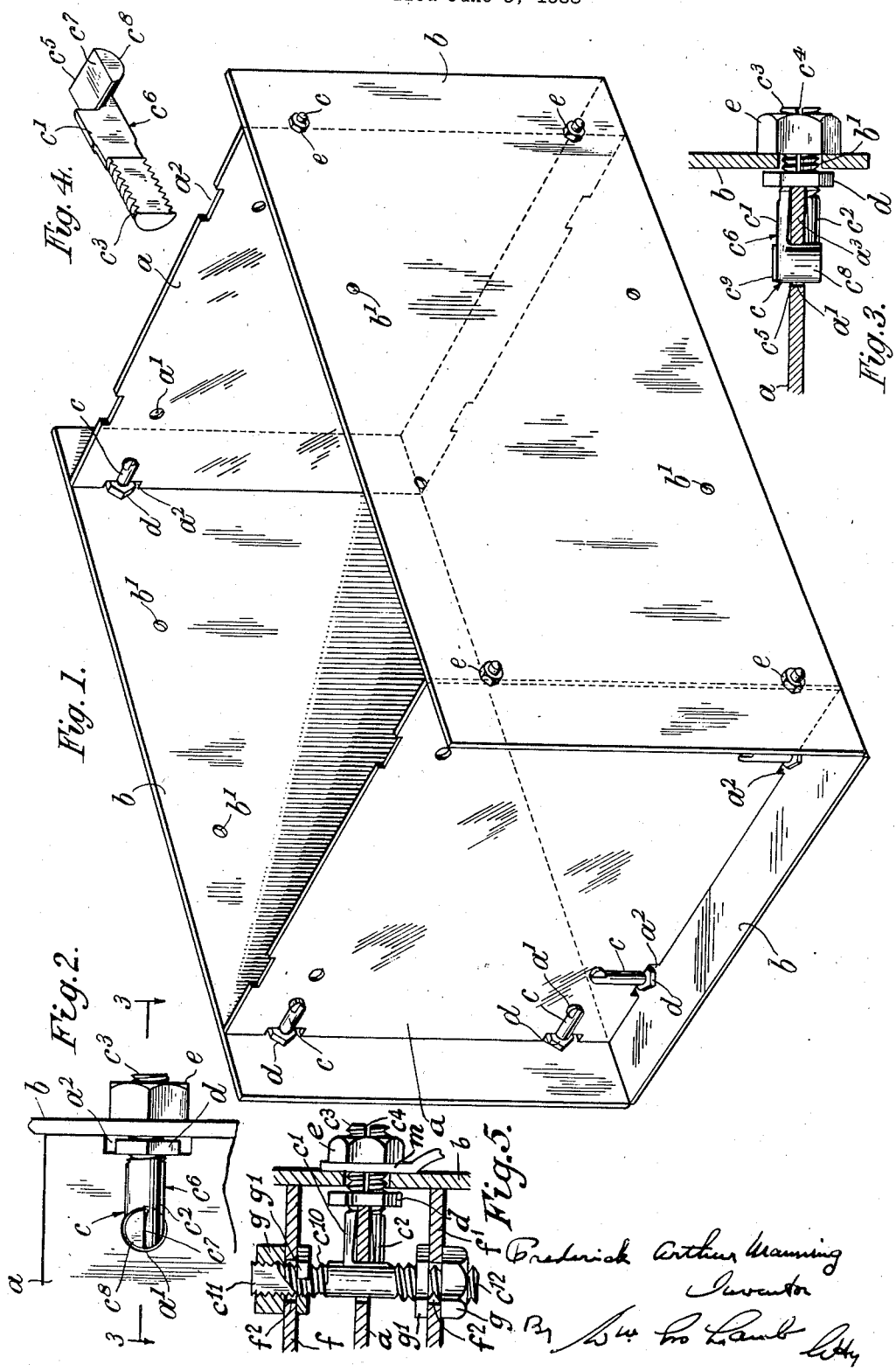

Patented Apr. 4, 1939

2,153,259

UNITED STATES PATENT OFFICE 2,153,259

SECURING MEANS

Frederick Arthur Manning, London, England

Application June 9, 1938, Serial No. 212,826
In Great Britain June 14, 1937

7 Claims. (Cl. 189—36)

This invention relates to means for detachably attaching metal plates, thin pieces of timber or other structural members, either temporarily or permanently in edge to side relationship. The invention is more particularly applicable to metal plates, thin pieces of timber or other material, such as, for instance, asbestos sheets, for the construction of nests of shelves, boxes, cases, book cases, filing cabinets, plate and other racks, portable buildings and other similar rectangular structures or structural devices. It is, however, also applicable to securing members whether flat or round in any desired position or angular relationship with their edges in edge to side relationship.

According to this invention one of the structural members (hereinafter referred to as the edge member) is formed with a hole or opening (hereinafter referred to as a hole) spaced apart from its edge and with a recess in the edge adjacent to the said hole, leaving a fillet between the hole and recess, while the other structural member (hereinafter referred to as the side member) is formed with a hole or opening (hereinafter termed hole) in any suitable position, a bolt having a screw at one end and a shank portion at the other end is cut away on a plane containing its axis to form a slot between the two segmental portions so formed in which slot the said fillet is fitted, while the ends of the shank portion remote from the screwed end have oppositely extending projections at right angles to the slot, which projections are adapted to fit together and to fit in said hole in the edge member, means is provided for fastening the screwed ends of the bolt together, which means is located in the recess in said edge member beyond which the screwed end of the bolt extends, and this extending end passes through the hole in the side member or members and receives a nut by which the structural members are fixed together.

If desired the recess in the side member can be dispensed with and a corresponding countersinking of the hole in the side member can be used to accommodate the means, for instance a threaded washer, which is provided for fastening the screwed ends of the bolt together.

The projections on the spigot end of the bolt may be extended in one or both directions and these extensions so formed are threaded or otherwise formed to receive other nuts or fastening devices for further structural members or parts.

Preferably the slot extends for only a short length at the centre of the bolt, sufficient to receive the fillet, the remainder of the screwed end being split diametrically so that when the two parts of the screwed end are brought together, they form a complete threaded end.

A form of construction of the structural members attached together according to this invention is illustrated by way of example in the accompanying drawing, wherein:

Fig. 1 is a perspective view of the structure.

Fig. 2 is a side elevation of part of the structure drawn to an enlarged scale.

Fig. 3 is a section on the line 3—3 in Fig. 2.

Fig. 4 is a perspective view of one part of the bolt.

Fig. 5 is a similar view to Fig. 3 illustrating a modified construction of the bolt.

In the construction illustrated the edge member $a$ comprises a metal plate formed with holes $a^1$ and edge slots $a^2$ leaving fillets $a^3$ at the edges, while the side members $b$ are formed with circular holes $b^1$.

The centre part of the bolt indicated generally at $c$ is cut away on each side of its axis to form two segmental parts $c^1$, $c^2$; the screwed end $c^3$ is divided at $c^4$ in a plane parallel with the chord of the segmental parts to form semicylindrical parts, while the extreme end $c^5$ of the shank portion $c^6$ (remote from the screwed end) is divided at $c^7$ in a plane extending at right angles to the dividing plane of the screwed end $c^3$ to form the two oppositely extending projections $c^8$, $c^9$. The shank portion $c^6$ is made bigger than the screwed portion $c^3$.

The two parts of the bolt so formed can be separated and fitted to the edge member by applying them one at each side of the fillet $a^3$ as shown clearly in Fig. 3 with their oppositely extending projections $c^8$, $c^9$ passing in opposite directions through the hole $a^1$ in said edge member $a$, and then these two parts $c^1$, $c^2$ are held while a nut $d$ or other securing member (hereinafter referred to as the bolt securing nut) is threaded or passed over the screwed end $c^3$ and tightened to secure the bolt firmly on the edge member $a$ in a position in which its screwed end extends beyond the edge of said member. The side member $b$ is then applied to the projecting screwed end and finally the nut or nuts $e$ for attaching said side member $b$ is screwed on to the screwed end of the bolt to fix it in position. The edge slot $a^2$ in the edge of the edge member $a$ must be large enough to take the bolt securing nut $d$, so that the said bolt securing nut lies flush with or within the edge of said edge member $a$ in order to ensure that the side member contacts when attached with the edge of the edge member and is thereby frictionally held in the required position.

This construction is advantageous in that it enables the bolt to be fixed to one structural member on the bench or ground or other convenient positions and definitely fixed in position on this member so that when erected it is only necessary to engage the projecting bolt (without holding it) with the other structural member or members b and apply and tighten up the attaching nut or nuts in order to fix the structural members in the required edge to side relationship and in the required positions.

As shown in Fig. 5 the projections $c^8$, $c^9$ may be prolonged to form at one side an extension $c^{10}$ on the projection $c^8$ and an extension $c^{11}$ on the projection $c^9$. Similar extensions may be formed on these projections $c^8$, $c^9$, at the opposite side of the bolt, only one of which is shown and marked $c^{12}$, the other being immediately below the extension $c^{12}$. These extensions $c^{10}$, $c^{11}$, $c^{12}$ and the one not shown are formed with screw threads so that each receives nuts $g$, $g^1$, which act to clamp further structural parts $f$ and $f^1$ to the extensions. The said structural members $f$, $f^1$ are formed with holes $f^2$ to enable the extensions to pass through them and the structural members may be arranged as shown parallel to the structural members $a$.

In addition to the structural members, diagonal stays or bracing members $m$ may also be fitted to the projecting screwed ends of the bolts and fixed by the nut or nuts screwing thereon.

What I claim as my invention and desire to secure by Letters Patent is:

1. In combination, structural members located edge to side, one of which members constituting the edge member having a hole spaced apart from its edge leaving a fillet at the edge, the other member constituting the side member having a hole formed therein, a two-part bolt having one part adapted to fit at each side of the said fillet and to engage in the hole in the edge member, means for attaching said bolt parts together on the edge member in a position in which it projects therefrom, said projecting part of the bolt passing through the hole in the side member and means for securing said side member to the bolt.

2. In combination, structural members located edge to side, one of which members constituting the edge member having a hole spaced apart from its edge and a recess in its edge adjacent the hole leaving a fillet between the edge and the hole, the other member constituting the side member having a hole formed therein, a two-part bolt having one part adapted to fit at each side of the said fillet and to engage in the hole in the edge member, means adapted to fit in said recess for attaching said bolt parts together on the edge member in a position in which the bolt projects therefrom, said projecting part of the bolt passing through the hole in the side member and means for securing said side member to the bolt.

3. In combination, structural members located edge to side, one of which members constituting the edge member having a hole spaced apart from its edge leaving a fillet at the edge, the other member constituting the side member having a hole formed therein, a two-part bolt having one part adapted to fit at each side of the said fillet and to engage in the hole in the edge member, means for attaching said bolt parts together on the edge member with the bolt projecting therefrom, said projecting part of the bolt passing through the hole in the side member and means for securing said side member to the bolt, one of said members having a recess to receive the said means for attaching the bolt parts together.

4. In combination, structural members located edge to side, one of which members constituting the edge member having a hole spaced apart from its edge leaving a fillet at the edge, the other member constituting the side member having a hole formed therein, a two-part bolt having segmental portions adapted to fit at each side of the said fillet, and having extensions on the segmental portions to engage in the hole in the edge member, means for attaching said bolt parts together on the edge member with the bolt projecting therefrom, said projecting part of the bolt passing through the hole in the side member and means for securing said side member to the bolt.

5. In combination, structural members located edge to side, one of which members constituting the edge member having a hole spaced apart from its edge leaving a fillet at the edge, the other member constituting the side member having a hole formed therein, a two-part bolt having segmental portions adapted to fit at each side of the said fillet and having extensions on the segmental portions to engage in the hole in the edge member, means for attaching said bolt parts together on the edge member with the bolt projecting therefrom, said projecting part of the bolt passing through the hole in the side member, means for securing said side member to the bolt, the said extensions being adapted to receive other structural members and means for attaching the said other structural members to said extensions.

6. In combination, structural members located edge to side, one of which members constituting the edge member having a hole spaced apart from its edge leaving a fillet at the edge, the other member constituting the side member having a hole formed therein, a two-part bolt having at one end segmental portions with their chordal faces opposed and spaced apart by an amount just sufficient to receive the fillet between them, with extensions on the segmental portions and having at the other end semi-cylindrical parts exteriorly threaded to engage in the hole in the edge member, means for attaching said bolt parts together on the edge member with the threaded end of the bolt projecting therefrom, said projecting threaded end of the bolt passing through the hole in the side member and at least one nut for securing said side member to the bolt.

7. In combination, structural members located edge to side, one of which members constituting the edge member having at least one recess in its edge and a hole spaced apart from each recess leaving a fillet between the recess and hole, the other member constituting the side member having a hole formed therein, a two-part bolt having at one end segmental portions with their chordal faces opposed and fitting against each side of the said fillet with extensions on said segmental portions to engage in the hole in the edge member and having at the other end semi-cylindrical portions exteriorly threaded, a nut engaging on said threaded end for attaching said bolt parts together on the edge member with the threaded end of the bolt projecting therefrom, said nut being of such a size as to fit in said recess in the edge member without projecting from the edge of said member, said projecting part of the bolt passing through the hole in the side member and at least one nut engaging said threaded end of the bolt for securing said side member to the bolt.

FREDERICK ARTHUR MANNING.